US009082229B1

(12) United States Patent
Scholler

(10) Patent No.: US 9,082,229 B1
(45) Date of Patent: Jul. 14, 2015

(54) TRANSFORMING ANIMATIONS

(75) Inventor: Jerome Scholler, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 694 days.

(21) Appl. No.: 13/104,353

(22) Filed: May 10, 2011

(51) Int. Cl.
G06T 13/00 (2011.01)
G06T 13/40 (2011.01)

(52) U.S. Cl.
CPC ........................................ *G06T 13/40* (2013.01)

(58) Field of Classification Search
None
See application file for complete search history.

(56) References Cited

U.S. PATENT DOCUMENTS

| 5,818,463 | A  | * | 10/1998 | Tao et al. ....................... 345/473 |
| 6,606,095 | B1 |   | 8/2003  | Lengyel et al. |
| 7,062,073 | B1 |   | 6/2006  | Turney et al. |
| 7,508,990 | B2 |   | 3/2009  | Pace |
| 8,502,815 | B2 | * | 8/2013  | Stefanoski et al. ........... 345/419 |
| 2004/0003370 | A1 | * | 1/2004 | Schenk et al. ................ 717/100 |
| 2005/0100319 | A1 |   | 5/2005 | Saed |
| 2009/0089710 | A1 | * | 4/2009 | Wood et al. ................... 715/835 |
| 2010/0259538 | A1 | * | 10/2010 | Park et al. ..................... 345/419 |

OTHER PUBLICATIONS

Lewis, J.P., "Fast Template Matching," Vision Interface 95, Canadian Image Processing and Pattern Recognition Society, Quebec City, Canada, May 15-19, 1995, pp. 120-123.

* cited by examiner

*Primary Examiner* — Phi Hoang
*Assistant Examiner* — Mohammad H Akhavannik
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes identifying one or more frames included in series of frames that represent a portion of an animated character. The identified one or more frames can be reconstructed from a portion of the series of frames absent the identified one or more frames. The method also includes removing the identified one or more frames from the series of frames to produce a reduced series of frames, and, transforming the reduced series of frames to produce an animation model that is capable of reconstructing the series of frames for an interactive virtual environment.

33 Claims, 8 Drawing Sheets

TRANSFORMING ANIMATIONS

TECHNICAL FIELD

This document relates to preparing animations, such as transforming frames of an animated character into models for use in a video game title.

BACKGROUND

Striving to present realistic viewing experiences, virtual environments such as video games has become computationally complex and call for more and more computing resources to provide the quality expected by a viewer. For example, viewers have grown to expect imagery of near photographic quality and audio comparable to studio quality. Along with being provided such high quality sensory input, viewers have come to expect intricate character actions (e.g., high-flying leaps) and recognizable emotions while controlling the movements of the character through the virtual environment during game play.

SUMMARY

The described systems and techniques are for preparing models, which include a finite number of shapes, from a series of animation frames. Along with reducing memory storage needs, the models may be transferred to a computing device (e.g., a game console) and used for efficiently reconstructing the animations represented in the frames.

In one aspect, a computer-implemented method includes identifying one or more frames included in series of frames that represent a portion of an animated character. The identified one or more frames can be reconstructed from a portion of the series of frames absent the identified one or more frames. The method also includes removing the identified one or more frames from the series of frames to produce a reduced series of frames, and, transforming the reduced series of frames to produce an animation model that is capable of reconstructing the series of frames for an interactive virtual environment.

Implementations may include any or all of the following features. Identifying the one or more frames may include determining if one or more adjacent frames can be used to reconstruct the corresponding one or more identified frames. Identifying the one or more frames may include determining if a previous sequence of four adjacent frames can be used to reconstruct the corresponding one or more identified frames. Identifying the one or more frames may include calculating a dot product of quantities associated with two frames included in the series of frames. Transforming the reduced series of frames may include principal component analysis. Transforming the reduced series of frames may include applying a weight to one or more of the frames included in the reduced series of frames. Transforming the reduced series of frames may include applying a compressed weight to one or more frames included in the reduced series of frames. The animation model may include thirty-two shapes. The represented portion of the animated character may include a face of the character. The interactive virtual environment may be a video game, a content creation environment, a virtual reality environment, or another type of interactive environment.

In another aspect, a computer-implemented method includes, in an iterative manner, quantizing an animation model shape produced by transforming a series of frames that represent a portion of an animated character. The method also includes adjusting the content of the series of frames to account for the quantized animation model shape, and, transforming the adjusted series of frames to produce another animation model shape. The method also includes combining the animation model shapes to define an animation model that is capable of reconstructing the series of frames for an interactive virtual environment.

Implementations may include any or all of the following features. Adjusting the content of the series of frames may include removing the quantized animation model shape from content of the series of frames. Quantizing the animation model shape may include reducing the precision of data that represents the animation model shape. Quantizing the animation model shape may include reducing the number of bits used to represent the animation model shape. The combined animation model shapes may include thirty-two shapes.

In another aspect, a system includes a computing device that includes a memory configured to store instructions. The computing device also includes a processor configured to execute the instructions to perform a method that includes identifying one or more frames included in series of frames that represent a portion of an animated character. The identified one or more frames can be reconstructed from a portion of the series of frames absent the identified one or more frames. The method also includes removing the identified one or more frames from the series of frames to produce a reduced series of frames, and, transforming the reduced series of frames to produce an animation model that is capable of reconstructing the series of frames for an interactive virtual environment.

Implementations may include any or all of the following features. Identifying the one or more frames may include determining if one or more adjacent frames can be used to reconstruct the corresponding one or more identified frames. Identifying the one or more frames may include determining if a previous sequence of four adjacent frames can be used to reconstruct the corresponding one or more identified frames. Identifying the one or more frames may include calculating a dot product of quantities associated with two frames included in the series of frames. Transforming the reduced series of frames may include principal component analysis. Transforming the reduced series of frames may include applying a weight to one or more of the frames included in the reduced series of frames. Transforming the reduced series of frames may include applying a compressed weight to one or more frames included in the reduced series of frames. The animation model may include thirty-two shapes. The represented portion of the animated character may include a face of the character. The interactive virtual environment may be a video game, a content creation environment, a virtual reality environment, or another type of interactive environment In another aspect, a system includes a computing device that includes a memory configured to store instructions. The computing device also includes a processor configured to execute the instructions to perform a method that includes, in an iterative manner, quantizing an animation model shape produced by transforming a series of frames that represent a portion of an animated character. The method also includes adjusting the content of the series of frames to account for the quantized animation model shape, and, transforming the adjusted series of frames to produce another animation model shape. The method also includes combining the animation model shapes to define an animation model that is capable of reconstructing the series of frames for an interactive virtual environment.

Implementations may include any or all of the following features. Adjusting the content of the series of frames may include removing the quantized animation model shape from content of the series of frames. Quantizing the animation model shape may include reducing the precision of data that represents the animation model shape. Quantizing the animation model shape may include reducing the number of bits used to represent the animation model shape. The combined animation model shapes may include thirty-two shapes.

In another aspect, a computer program product tangibly embodied in an information carrier includes instructions that when executed by a processor perform a method that includes identifying one or more frames included in series of frames that represent a portion of an animated character, wherein the identified one or more frames can be reconstructed from a portion of the series of frames absent the identified one or more frames. The method also includes removing the identified one or more frames from the series of frames to produce a reduced series of frames, and, transforming the reduced series of frames to produce an animation model that is capable of reconstructing the series of frames for an interactive virtual environment.

Implementations may include any or all of the following features. Identifying the one or more frames may include determining if one or more adjacent frames can be used to reconstruct the corresponding one or more identified frames. Identifying the one or more frames may include determining if a previous sequence of four adjacent frames can be used to reconstruct the corresponding one or more identified frames. Identifying the one or more frames may include calculating a dot product of quantities associated with two frames included in the series of frames. Transforming the reduced series of frames may include principal component analysis. Transforming the reduced series of frames may include applying a weight to one or more of the frames included in the reduced series of frames. Transforming the reduced series of frames may include applying a compressed weight to one or more frames included in the reduced series of frames. The animation model may include thirty-two shapes. The represented portion of the animated character may include a face of the character. The interactive virtual environment may be a video game, a content creation environment, a virtual reality environment, or another type of interactive environment.

In another aspect, a computer program product tangibly embodied in an information carrier includes instructions that when executed by a processor perform a method that includes, in an iterative manner, quantizing an animation model shape produced by transforming a series of frames that represent a portion of an animated character. The method also includes adjusting the content of the series of frames to account for the quantized animation model shape, and, transforming the adjusted series of frames to produce another animation model shape. The method also includes combining the animation model shapes to define an animation model that is capable of reconstructing the series of frames for an interactive virtual environment.

Implementations may include any or all of the following features. Adjusting the content of the series of frames may include removing the quantized animation model shape from content of the series of frames. Quantizing the animation model shape may include reducing the precision of data that represents the animation model shape. Quantizing the animation model shape may include reducing the number of bits used to represent the animation model shape. The combined animation model shapes may include thirty-two shapes.

Details of one or more implementations are set forth in the accompanying drawings and the description below. Other features, aspects and advantages will be apparent from the description and drawings, and from the claims.

DETAILED DESCRIPTION

Figure 1:
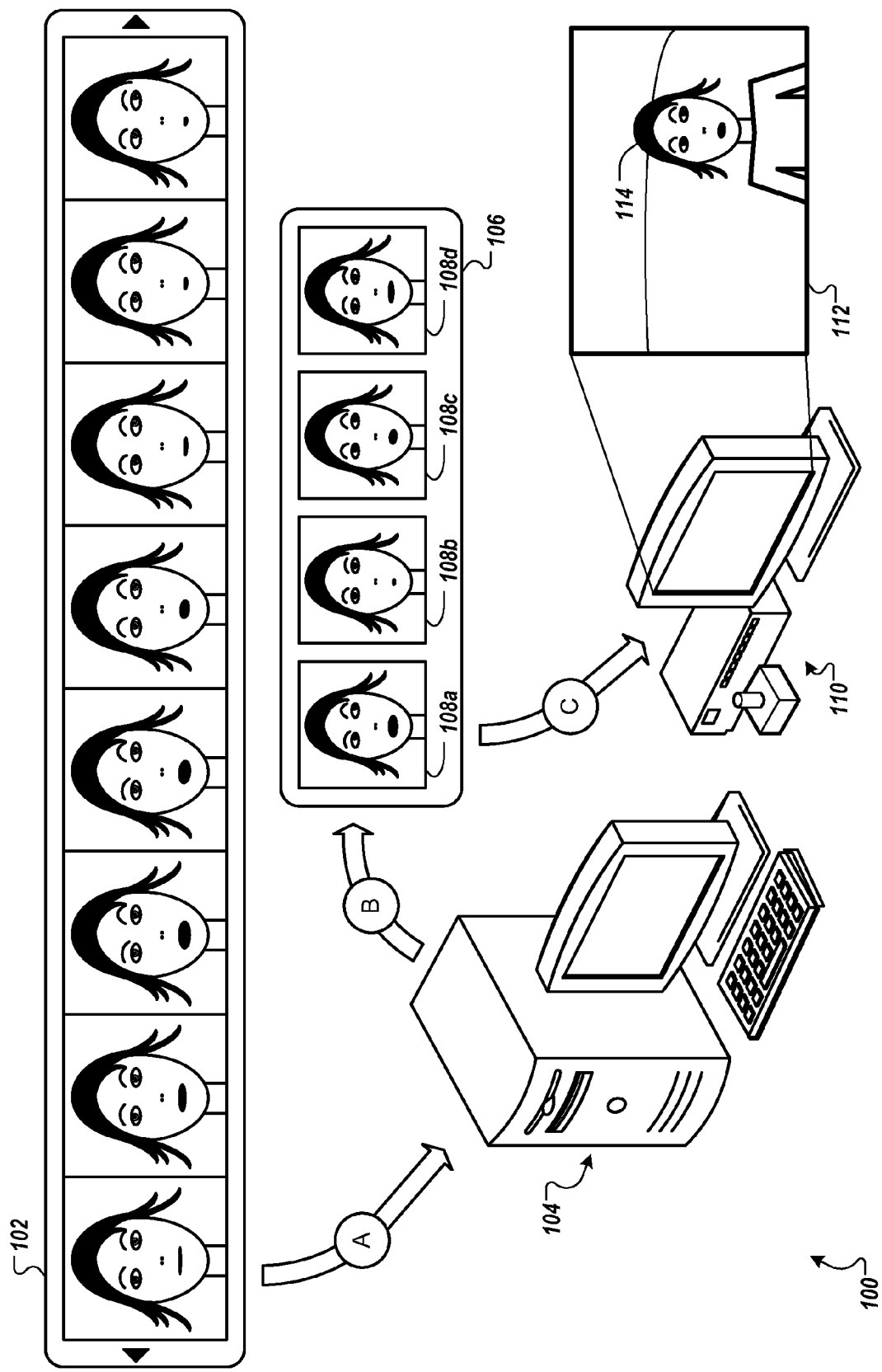
FIG. 1 illustrates an animation system.

FIG. 1 illustrates an exemplary animation system 100 for producing animations with various levels of quality, for example, depending upon the viewing environment. For example, the animation system 100 may be used for providing animations for online applications such as interactive virtual environments (e.g., video game titles, etc.). In general, to render animations, such interactive environments may be considered as having lesser capabilities compared to offline environments (e.g., animation systems for movie production, etc.). For example, computational resources (e.g., processing power, memory size, etc.) may be limited for online system components (e.g., game consoles, consumer devices, etc.) due to physical and operational constraints. Further, since character movements, points of view, character appearance, environments, etc. are not typically known prior to game play (e.g., characters are directed by user interaction), complete animation sequences may not be created far in advance prior to being rendered (compared to producing animations for movies). To produce animations in an efficient online manner, the animation system 100 uses one or more processing techniques (e.g., compression) to allow animations to be transferred, e.g. to a target computing device such as a game console, efficiently reconstructed and rendered based upon the conditions of the virtual environment, user interactions (e.g., initiating character movements), etc. Other types of interactive environments may also use the processing techniques, for example, efficiently produced animations may be used in environments for creating content (e.g., interactive authoring tools and applications, etc.), virtual reality environments (e.g., avatar-based environments, a virtual reality world or community such as Second Life from Linden Lab, etc.) or other types of environments.

For illustration, the animation system 100 processes an animation 102 that includes a series of frames that correspond to a sequence of time. The animation 102 can be produced by using one or more techniques and methodologies such as keyframing, simulation, motion capture, and/or blend shapes, to name a few examples. Various types of content may be included in the animation 102, for example, one or more characters (e.g., moving or stationary) or other types of objects (e.g., clothing) may be represented in the animation. In the present example, the animation 102 represents facial expressions of a character for a video game. Over a series of frames, the animation 102 illustrates the character changing its facial expressions (e.g., facial movements in relation to speech).

The animation system 100, in this example, includes components such as a computer system 104 that can include one or more processing devices, input devices, output devices, and storage devices. Here, as shown by arrow A, the computer system 104 may receive the animation 102, for example, which may be provided in one or more forms such as a computer file, a set of computer commands, etc. that contains animation content (e.g., produced from motion capture video, motion capture data, created by an animator, etc.). In one example, the animation 102 may be an animation file transferred to the computer system 104, or, the animation 102 may be produced by the computer system 104 (e.g., as being used by an animator).

To prepare the animation 102 for an online application, the computer system 104 can use one or more techniques to process the animation for transfer. For example, the animation may be transformed (e.g., compressed) using one or more methods that include techniques such as Principal Component Analysis (PCA) and other techniques that can be implemented individually or in combination with PCA. In general, PCA compresses data into a vector space of reduced dimension. In this application, within this space, each frame of the animation 102 can be expressed by a collection of coefficients. As represented by arrow B, an animation model 106 can be produced by the computer system 104 based on the animation 102. In this illustration, the animation model 106 includes a set of shapes 108a-d that represent information associated with one or more objects (e.g., a character) or object features (e.g., a character's face, clothing, etc.). Such information may represent object movement, feature positions, texture, color, lighting parameters, etc. For example, the shapes 108a-d may be shapes (e.g., that may be provided by PCA or other transformation techniques) that may be transferred and used for reconstructing portions of the animation 102. In this example, the four shapes 108a-d are produced for providing an approximation of the animation 102, however, more or fewer shapes may be produced in other implementations. In general, producing additional shapes may provide a more accurate approximation of the animation 102.

The animation system 100 also includes a display system 110 that includes a display screen 112 for viewing animations provided by the animation model 106. The display system 110 can be a video game console or other type of computing device that may or may not be capable of network communication (e.g., accessing a network such as the Internet). Various types of display technology may be utilized by the display screen 112, for example flat screen technology, video projection technology, or virtual reality device technology, to name a few examples. One or more techniques may be used for transferring the animation model 106 to the display system 110. For example, the animation model 106 can be bundled with video game content contained on a physical medium such as a disc (e.g., a compact disc). Alternatively, rather than using a physical medium, the animation model 106 can be transferred to the display system 110 using a network connection such as an Internet connection, or other type of networking technology.

In this illustrative example, the content of the animation model 106 represents facial expressions of a real-time video game character. By using the animation model 106, an approximation of the character facial expressions represented in the animation 102 can be rendered and presented on the display screen 112. While the animation model 106 (e.g., produced by compressing the content of the frames of the animations 102) can reconstruct a realistic animation for rendering, techniques may be implemented to conserve processing time along with memory storage needs. For example, in producing the animation model 106, each frame of the animation 102 is typically considered equally important by the transformation technique (e.g., PCA compression). As such, frames that represent the character's face as not moving or not being animated (e.g., character's face is out-of-frame or occluded) are weighted the same as frames which represent the character's face being animated (e.g., changing from one facial expression to another expression). By using both useful and relatively unimportant frames to produce the animation model 106, both types of frames could be reconstructed from the model. However, the need for reconstructing such unimportant frames may be minimal or even non-existent. Additionally, transforming animations such as the animation 102 can be costly in terms of processing time and use of computation resources (e.g., memory space). For example, seconds or minutes of animation may directly translate to minutes of processing time. As such, reducing the computational needs (e.g., processing time, memory space) needed to transform animation frames into an animation model is beneficial (e.g., for executing PCA operations). Further, the produced animation model (e.g., a vector space calculated by the PCA) may call for considerable memory space. Additionally, by reducing the size of the animation model, such as animation model 106, less time may be needed to load the model to reconstruct and render the animation represented in the model (as represented in an exemplary reconstructed animation 114 displayed in the display screen 112).

One or more techniques or methodologies may be implemented to efficiently produce animation models from appropriate content (e.g., frames that represent facial expressions of an animated character) while not using less desirable content (e.g., frames in which the animated character's face is obscured). For example, animation frames considered less important may be identified and removed from a series of animation frames that is used for creating an animation model (e.g., via PCA). Weighting techniques may also be used for directing the use of content for creating the animation models. Processing techniques may also be implemented to reduce the size of the produced animation models themselves while they still retain the ability to precisely reconstruct the animations used to create the models. Other animation model production and usage techniques may be implemented, for example, techniques and animation systems described in U.S. patent application Ser. No. 12/504,263, entitled "Animation with Adjustable Detail Level" and U.S. patent application Ser. No. 12/793,273, entitled "Animation Compression" which are hereby incorporated by reference in their entirety, may be implemented.

Figure 2:
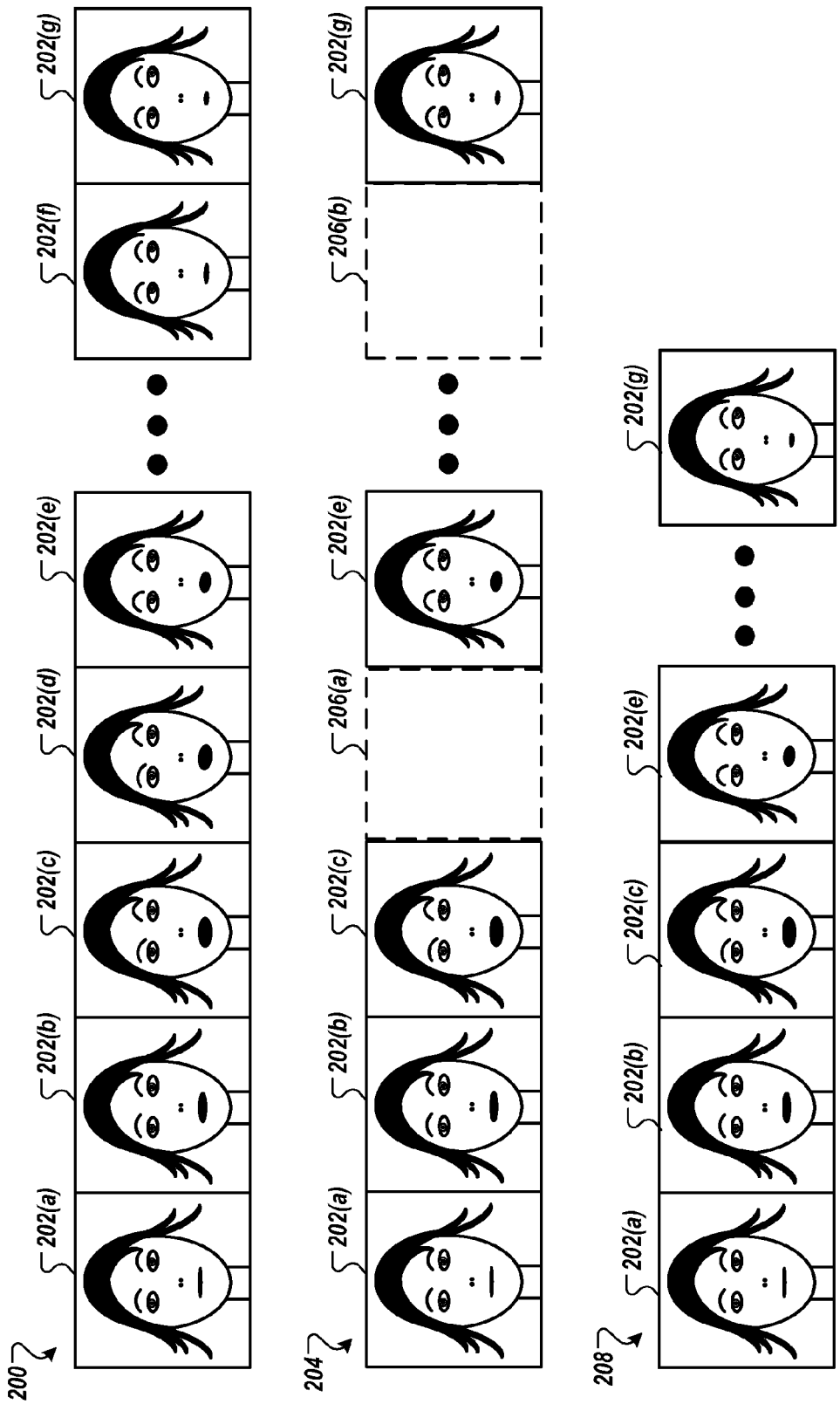
FIG. 2 illustrates removing individual frames included in a series of animation frames.

Referring to FIG. 2, a series of frames of an animated character 200 are illustrated in a sequence of frames 202(a), 202(b), . . . , 202(g). The frame sequence of the series 200 corresponds to a period of time during which the character transitions through a series of facial expressions (e.g., shifting her eyes from right to left, opening and closing her mouth, etc.). Each frame in the series 200 includes the character's face (e.g., none have the character out-of-frame or the character's face obscured). However, the series may contain frames that may not be needed (e.g., for PCA) to create an animation model. For example, the content of some frames may be considered repetitive (compared to others) and not needed for creating a model. Similarly, frames in which the character's face is out-of-frame, obscured, etc. may also be considered as not being needed to create an animation model.

As represented in a series of frames 204, whose frames are equivalent to the frames of series 200, particular frames (e.g., frames 202(d) and 202(f) have been identified as not being needed to create an animation model that may be capable of reconstructing the content of each frame in the series 204. In this example, frame content similarity provides the basis for removing frames from the series. For example, the facial expressions represented in frames 202(b) and 202(c) are similar to the facial expression of frame 202(d). In a similar manner, frames preceding frame 202(f), which are not shown in the figure, provide similar facial expressions to the frame 202(f). Due to these similarities, both frames 202(d) and 202(f) are removed from the series 204 and gaps 206(a) and 206(b) (highlighted with dashed-line boxes) represent the now unoccupied locations of these frames in the series. Once removed, the reduced set of frames (represented by a frame series 208) may be used for creating one or more animation models. For example, the reduced frame series 208 may be used in PCA calculations to produce one or more models.

Figure 3:
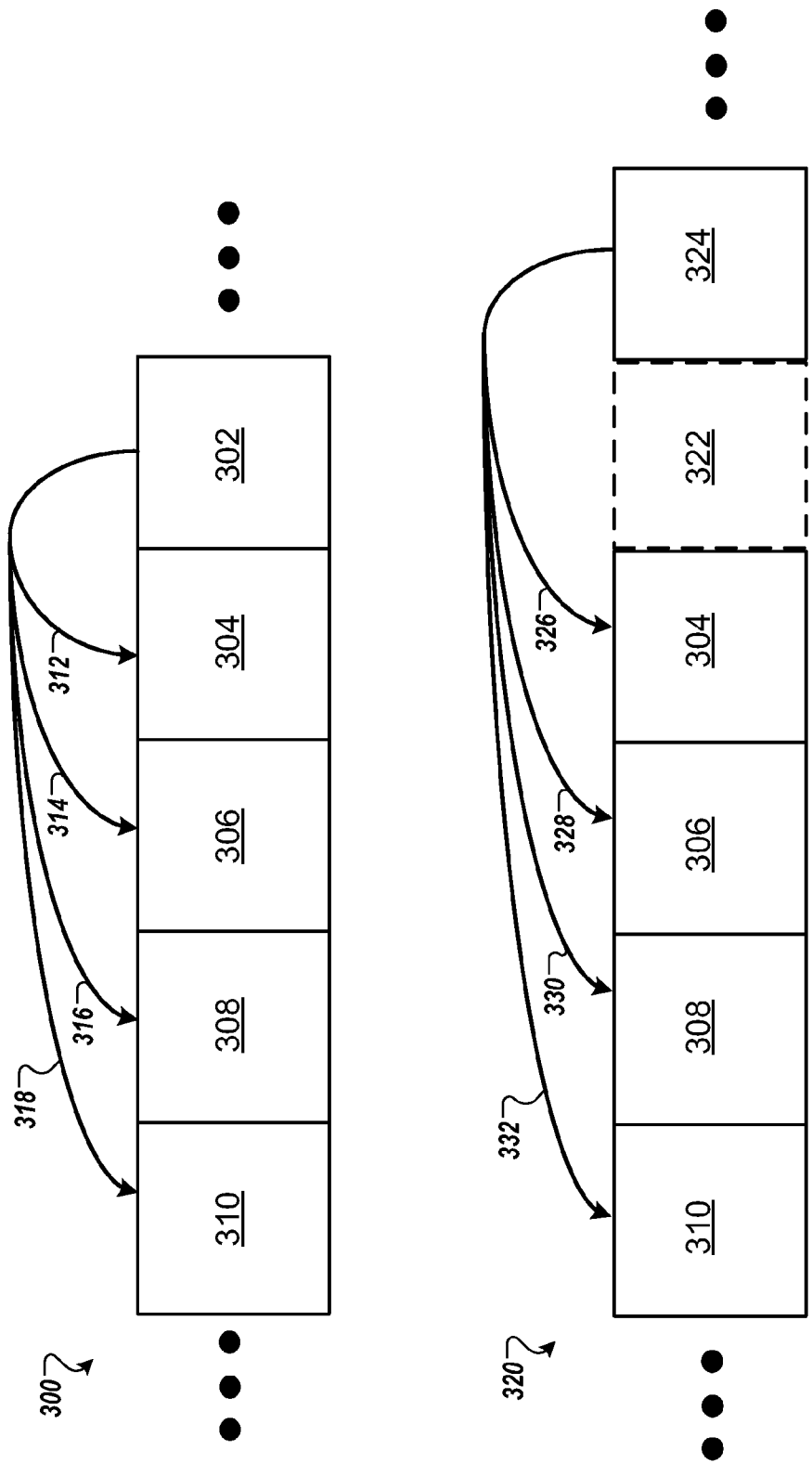
FIG. 3 illustrates a technique for identifying frames to be removed.

Referring to FIG. 3, one or more techniques and methodologies may be implemented for determining if one or more frames can be removed from a series of frames for model production. For example, a frame (referred to as a target frame) may be removed based upon one or more frames in the general vicinity that include similar content (e.g., similar facial expressions). In one implementation, nearby frames may be analyzed to determine if their content can express the content of the target frame. If not, the target frame is retained in the series of frames. However, if the frame can be expressed by content of the nearby frames, the target frame can be removed from the frame series. Since the frame can be expressed by nearby frames, there is no significant need to transform the frame (e.g., compress via PCA) since transforming the nearby frames can produce an animation model that is capable of reconstructing the target frame.

In one implementation, a technique for identifying a target frame that may be discarded is to determine if the frame can be expressed as a linear combination of other frames. Such a technique may be represented in a simplified mathematical form as:

$$F_i = \sum_{j \neq i} w_j F_j \quad (1)$$

in which frame $F_i$ can be discarded if a linear combination of other frames $F_j$ can express the frame $F_i$. In such a situation, the frame $F_i$ would not considerably contribute to an animation model (e.g., vector space) produced from a PCA calculation. To calculate the linear combination, a weight $w_j$ is calculated and applied to the corresponding frame $F_j$. In one implementation, the weight corresponds to the dot product of:

$$w_j = F_i \cdot \frac{F_j}{(\|F_j\| * \|F_j\|)}. \quad (2)$$

As such, each weight $w_j$ represents the amount of information needed from frame $F_j$ for producing a corresponding portion of the target frame $F_i$. Correspondingly, if the target frame $F_i$ can be expressed by the linear combination of $F_j$, the target frame may be removed from the frame series. However, if the linear combination is unable to express $F_i$, the target frame is typically retained in the frame series.

In equation (1) a collection of "j" frames is used to determine whether the target frame can be expressed by such a linear combination. For computational efficiency, the collection may include a relative small number of frames such as four frames to determine if a particular frame is "uninteresting" and may not be needed for producing an animation model. As such, frames located nearby to a target frame may include content that may be linearly combined (e.g., using equation (1) (with j=4) to express the target frame. In the illustrated example, a portion of a frame sequence 300 includes a target frame 302 and four frames 304, 306, 308 and 310 that are located directly behind the target frame 302 in the sequence. As represented by equation (2), a weight is computed for each of the frames 304-310 by calculating the dot product of the target frame 302 and each of the previous four frames. For example, as represented by arrow 312, a weight for frame 304 is computed by calculating the dot product of target frame 302 and frame 304. Similarly, as represented by arrows 314, 316 and 318, weights are computed for frames 306, 308 and 312 by calculating respective dot products between target frame 302 and frames 306, 308 and 310. Once the weights are calculated, the linear combination is computed to determine if frame 302 should be retained or discarded from the frame sequence 300.

In the illustrated example, frame 302 is determined to be expressible by the previously located four frames 304, 306, 308 and 310. As such, a reduced frame sequence 320 is formed due to the removal of the frame 302 (now represented as a gap 322 with dashed-line box). Moving to the next target frame 324 in the sequence 320, four frames are used in a similar manner to determine if target frame 322 can be expressed by a linear combination. In this arrangement, the four frames used for the determination are frames that have been previously tested as target frames and identified to remain in the sequence 320. As such, frames 304, 306, 308 and 310 are used, and, corresponding dot products with the target frame 324 (as represented by corresponding arrows 326, 328, 330 and 332) are calculated to determine the four respective weights. For example, arrow 326 represents calculating the dot product of target frame 324 and frame 304. Once calculated, the weights are used (e.g., in equation (1) with j=4) to attempt to compute the linear combination and determine if the combination expresses the target frame 324. If appropriately expressed, frame 324 may be discarded to further reduce the sequence 320, else if not appropriately expressed, the frame 324 is retained and the techniques moves forward to identify and check the next target frame in the sequence.

In the illustrated example, four previously retained frames located behind the target frame are used to determine if the target frame should be retained. However, instances occur (when using this technique) in which less than four frames may be available for making such a determination. For example, being the initial frame in a frame sequence, the first frame may be retained since there are no previous frames in the sequence (to test the first frame). To determine if the second frame should be retained, the first frame alone may be used (e.g., by calculating the dot product of the first and second frames) in an attempt to express the contents of the second frame. As such, instances can occur in which less than four previously retained frames are used to determine if a target frame is to be retained. Further, while four frames are used in this example for making such a determination, more or less frames may be used in other arrangements. The location of the frames used for making the determination may also be different. For example, rather than using earlier located frames, frames located in sequence positions after the target frame may be used to determine if the target frame can be expressed as a linear combination of these frames. In still another example, frames located in sequence positions ahead and behind the target frame may be used for making the determination whether or not to retain the target frame. In the illustrated example, a dot product calculation is used to determine if a target frame may be expressed as a linear combination of four retained frames located ahead of the target frame position in the sequence. One or more techniques may be implemented, alone or in combination with calculating dot products, to determine if a target frame has been expressed by other frames. For example, one or more thresholds may be used in determining if the linear combination accurately expresses the target frame. Non-linear techniques may also be incorporated. In still another technique, weights may be applied to the retained frames (e.g., as an importance indicator) for use in calculating the animation model.

Applying weights to retained frames can be considered as rescaling the retained frames prior to being processed (e.g., via PCA) to produce an animation model. For example, weights may be applied such that some frames may appear as being more important frames (in a PCA computation) than other retained frames. As such, frames deemed more important may be represented in the initially produced shapes (e.g., vectors) of an animation model while frames considered to be of lesser importance would be more represented in later produced shapes of the animation model. Various types of weighting schemes may be implemented, for example, for each discarded frame, the weight needed to express a frame (e.g., $w_j$) may be applied. As such, for the discarded frame, a retained frame could be represented as:

$$\dot{F}_j = (\Sigma w_{ij} + 1) F_j. \quad (3)$$

In one convention, for a particular frame, $F_j$, a weight is calculated by summing the dot products of the frame and each discarded frame. For example, referring briefly to FIG. 3, a portion of the weight assigned to frame 304 may include the dot product of frame 304 and the discarded frame 302. One or more additional functions may be used in calculating the weights for each retained frame. For example, weights may be scaled by a logarithmic function to compress the weight values (e.g., compress large weights applied to uninteresting frames). In one implementation the logarithmically scaled weights may be represented as:

$$\dot{F}_j = (\log(1 + \Sigma w_{ij}) + 1) F_j. \quad (4)$$

As such, the values of applied weights would scale to a relatively smaller range.

By reducing the number of frames used to produce an animation model, a considerable amount of processing time and storage space may be conserved. For example, by projecting-back four retained frames (i.e., using the four previously retained frames to determine if a target frame should be retained), a sequence of 16,000 frames may be reduced to 1200 frames. Along with conserving significant memory, the processing time needed to produce an animation model (via PCA) may be reduced by fifty fold.

Figure 4:
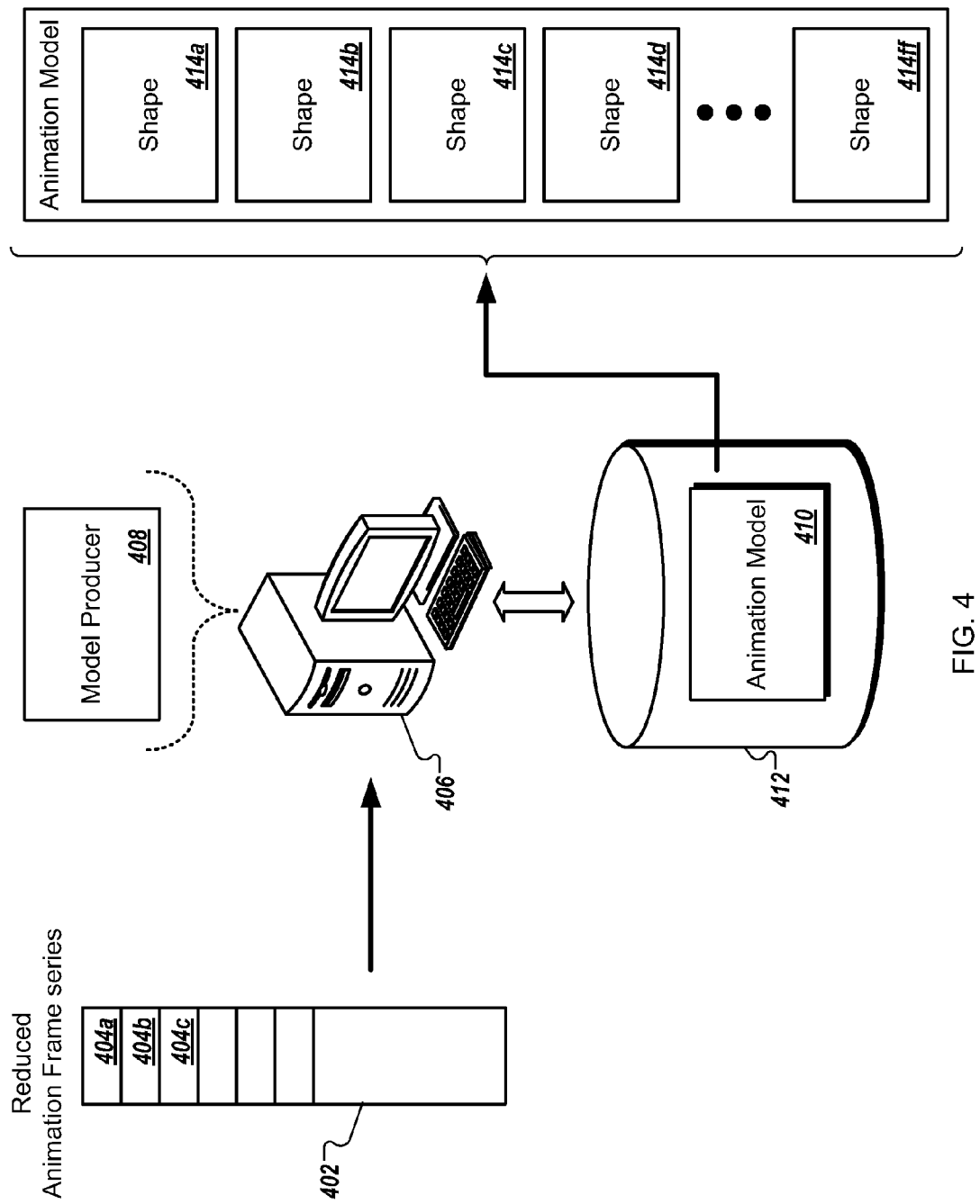
FIG. 4 illustrates processing frames into animation models.

Referring to FIG. 4, operations are illustrated for using a reduced series of animation frames to produce a compressed animation model. In this example, a series of animation frames 402 (e.g., that include frames 404a, 404b, 404c, etc.) has been reduced by discarding frames that may be expressed by frames that appear earlier in the sequence. This reduced series of animation frames 402 (e.g., along with corresponding weights) is provided to a computer system 406 for being transformed (e.g., compressed) into an animation model. In this example, the reduced series of animation frames 402 also includes corresponding weights (e.g., that represent the relative importance of a frame) for the retained frames. To provide such functionality, a model producer 408 is executed by the computer system 406 to produce, for example, an animation model 410 that is stored on a storage unit 412 (e.g., hard-drive, CD-ROM, etc.) in communication with the computer system 406. The animation model 410 can include a set of shapes (e.g., PCA vectors) or other types of objects. As illustrated in the figure, in this example, the animation model 410 includes a set of 32 shapes (e.g., partially represented with shapes 414a, b, c, d, etc., and a shape 414ff), however, in some implementations, more or less shapes may be included. In the present example, shapes included in the animation model 410 can be used to approximate the content included in the reduced series of animation frames 402 (e.g., facial expressions) and the content included in the discarded frames. In general, the size of the animation model 410 needs less storage space than the reduced series of animation frames 402, however, in some arrangements the storage space may be larger or equivalent.

Along with executing operations for producing the animation model 410, the model producer 408 may be capable of additional operations. For example, updating operations may be provided by the model producer 408 for incorporating additional animation content (e.g., additional frames, series of frames, etc.) into a model. By introducing additional frames, previously produced animation models may be refined (or additional shapes produced) to account for the additional content. Updating may also include discarding newly introduced frames using a technique similar to the technique illustrated in FIG. 4. By allowing such updates, the animation model 410 may be further refined and capable of representing a broader scope of character features (e.g., facial expressions).

Figure 5:
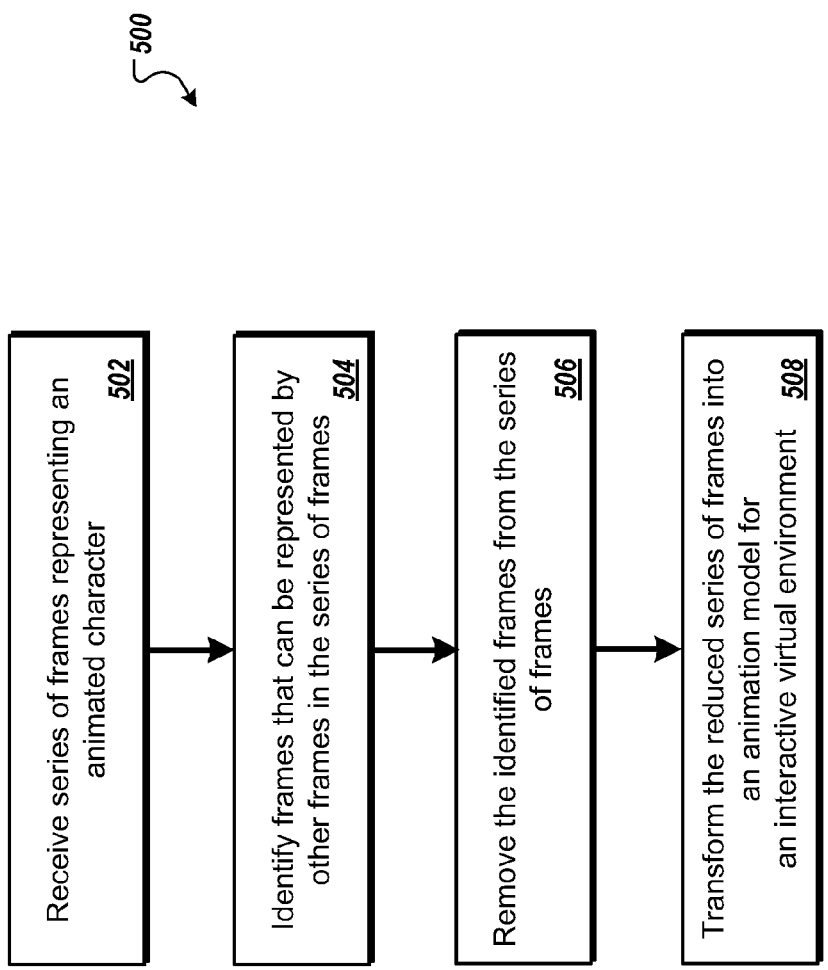
FIG. 5 is an exemplary flowchart of operations for producing an animation model from a reduced set of animation frames.

Referring to FIG. 5, a flowchart 500 represents operations of a computing device such as the computer system 406 (shown in FIG. 4) to produce an animation model for an interactive virtual environment (e.g., a video game title) from a reduced series of animation frames. Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computing device may include receiving 502 a series of frames that include content that represent animated character or a portion of an animated character (e.g., a character's face). In some arrangements, the series of frames represent actions associated with the character (e.g., the character transitioning through a series of facial expressions) for being rendered in an interactive virtual environment (e.g., a video game). Once received, operations may also include identifying 504 one or more frames (contained in the frame series) that can be represented by other frames in the series. For example, a facial expression of a character represented in one frame may be expressed by a linear combinations of the content represented in one or more (e.g., four) other frames in the series. If determined that the series includes one or more such identified frames, operations may include removing 506 the one or more identified frames from the series of frames, thereby creating a reduced series of frames. For example, by projecting a frame onto the last four previously occurring frames in the series, a determination may be made whether the contents of the frame can be expressed from the contents of the previous four frames in the series. In some arrangements the identifying 504 and removing 506 operations may be executed as a frame is received (in order as provided by the sequence). Once the appropriate frame or frames have been removed, operations may include transforming 508 the reduced series of frames into an animation model for use with the interactive virtual environment. For example, the content included in the reduced series of frames may be used by a compression technique (e.g., PCA) to produce an animation model (e.g., a collection of PCA vectors that represent shapes) that may be used to reconstruct the frames of the reduced series and the frames removed from the originally received series of frames. Other operations may also be executed in producing an animation model. For example, during production of the animation model, portions of the model may processed in an iterative manner to reduce the size of the model itself while retaining the ability to accurately reconstruct the frames used to produce the model.

Figure 6:
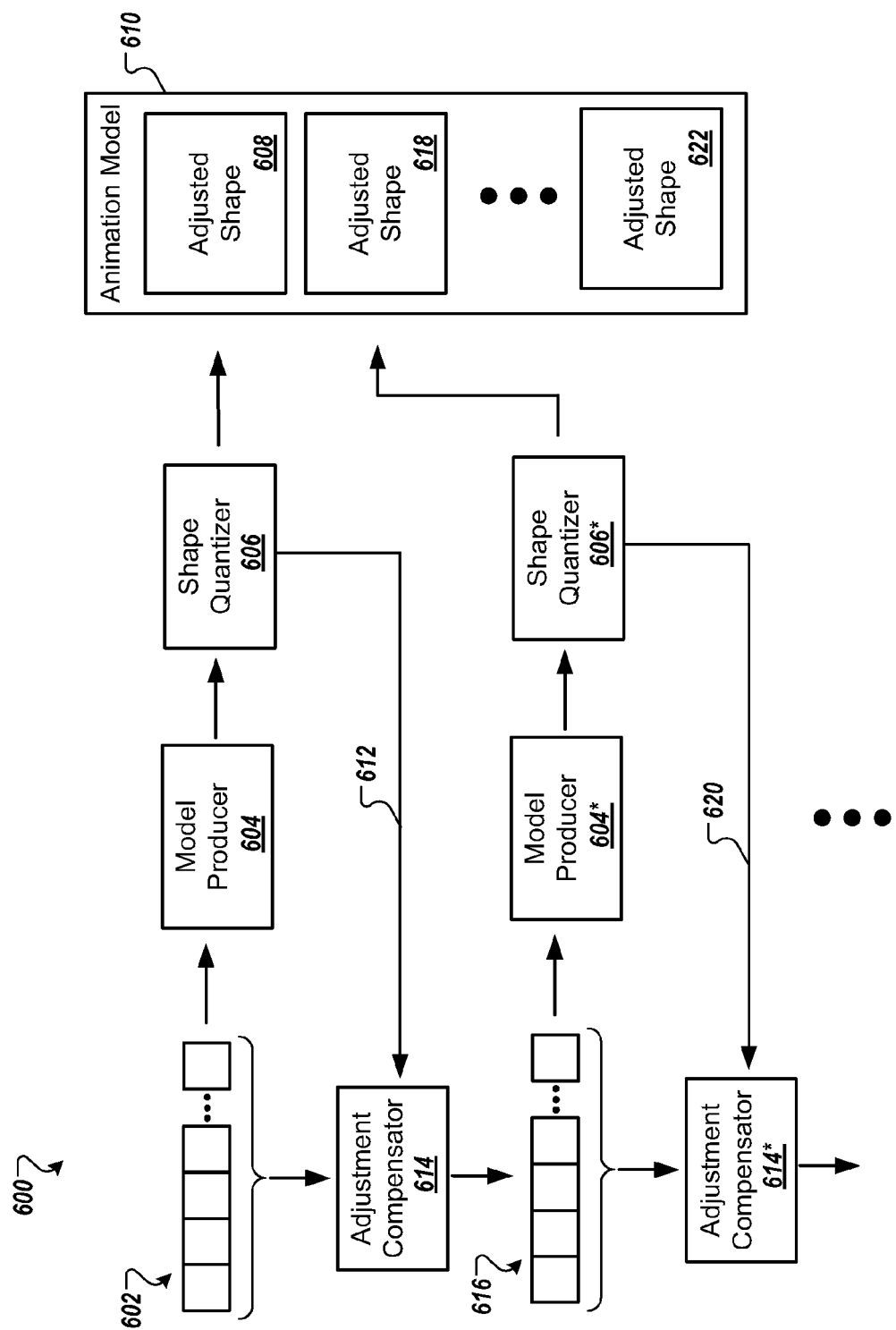
FIG. 6 illustrates a technique for quantizing an animation model.

Referring to FIG. 6, a flow diagram 600 illustrates an iterative approach of producing a reduced size animation model from a series of frames 602. Similar to the previously described examples, the content of the individual frames may represent the face of an animated character to be rendered in one or more scenes of an interactive virtual environment (e.g., a video game). Along with transforming (e.g., compressing) the frames to produce an animation model, the model itself may be processed to reduce storage space needs but still be capable of reconstructing the frames of the series 602. In this arrangement, as portions of the model are produced, the portions are quantized for size reductions. For example, provided the series of frames 602, the model producer 604 is requested to produce one shape of an animation model (e.g., PCA is used to produce one vector from the frame series). Once produced, the shape is provided to a shape quantizer 606 that quantizes the data that represents the produced shape. For example, the requested vector produced by PCA (executed by the model producer 604) may include vector elements with a particular precision, e.g., thirty-two bits floating point numbers. To reduce size, the shape quantizer 606 may adjust these elements (e.g., remove bits) such that less data is needed to represent the elements. For example, the thirty-two bits floating point numbers provided by the model producer 604 may be adjusted to eight-bits floating point numbers (e.g., 1 sign bit, 3 bit exponent and 4 bit mantissa). From these operations, an adjusted shape 608 (e.g., PCA vector) may be used to define an animation model 610.

Such adjustments to an animation model shape (e.g., dropping bits to change from thirty-two bits floating point numbers to eight bits floating point numbers) may cause information to be loss (e.g., a loss of precision). To compensate for such information losses, one or more techniques may be implemented. For example, in the next computational iteration, the model producer 604 may be notified of the lost information being introduced by the shape quantizer 606. In this arrangement, the adjusted shape produced by the shape quantizer 606 is used to provide the model producer 604 with the lost information. Provided the information, the model producer 604 can use the information for producing the next shape for the animation model 610. As illustrated with an arrow 612, the adjusted shape 608 is also provided to an adjustment compensator 614. Representing the shape computed by the model producer 604 and the information loss caused by the shape quantizer 606, the adjusted shape 608 is processed by the adjustment compensator 614 such that the lost information can be used by model producer 604 to produce the next shape for the animation model 610. For example, adjustment compensator 614 may subtract the content represented by the adjusted shape 608 from the content represented in the frame series 602 to produce a compensated frame series 616. As such, the information representing the produced shape (prior to being quantized) and the information lost due to quantization is removed from the frame series 602 to produce the compensated frame series 616. To produce the next shape (i.e., the second shape) for the animation model 610, the compensated frame series 616 is provided to the model producer (for viewing ease, a second instance of the model producer is shown for this iteration and labeled as model producer 204*). Correspondingly, a second shape produced by the model producer 604* is requested and provided to the shape quantizer (also for viewing ease, illustrated as a second instance of the shape quantizer is shown for this iteration and labeled shape quantizer 606*). Similar to the previous iteration, the shape quantizer 606* quantizes the shape provided by the model producer 604* (e.g., removes bits to change the thirty-two bits floating point values of the PCA vectors into eight bits floating point values) to produce an adjusted shape 618 that is included in the animation model 610. To continue the iterative process of accounting for the effects of quantizing the animation model shapes, the adjusted shape 618 is also provided to the adjustment compensator 614 (also for viewing ease, illustrated as a second instance of the adjustment compensator for the next iteration and labeled adjustment compensator 614*) as referenced with an arrow 620. The process continues in an iterative manner until a predefined number (e.g., sixteen, thirty-two, etc.) of adjusted shapes has been computed. In this particular example, an adjusted shape 622 represents the shape computed during the final iteration of the process. Typically, a model producer can produce the predefined shapes (e.g., sixteen shapes) in a single processing iteration. As such, executed in an iterative manner to account for quantization effects can increase processing time. However, by producing such quantized shapes, space needed for storing the animation model is reduced, which may be advantageous for the limited memory capacity of hardware used to produce interactive virtual environments (e.g., video game console). Further, by producing adjusted shapes (for an animation model) from a reduced set of animation frames (e.g., shown in FIGS. 3 and 4), additional storage capacity may be conserved for storing the reduced set of animation frames.

Figure 7:
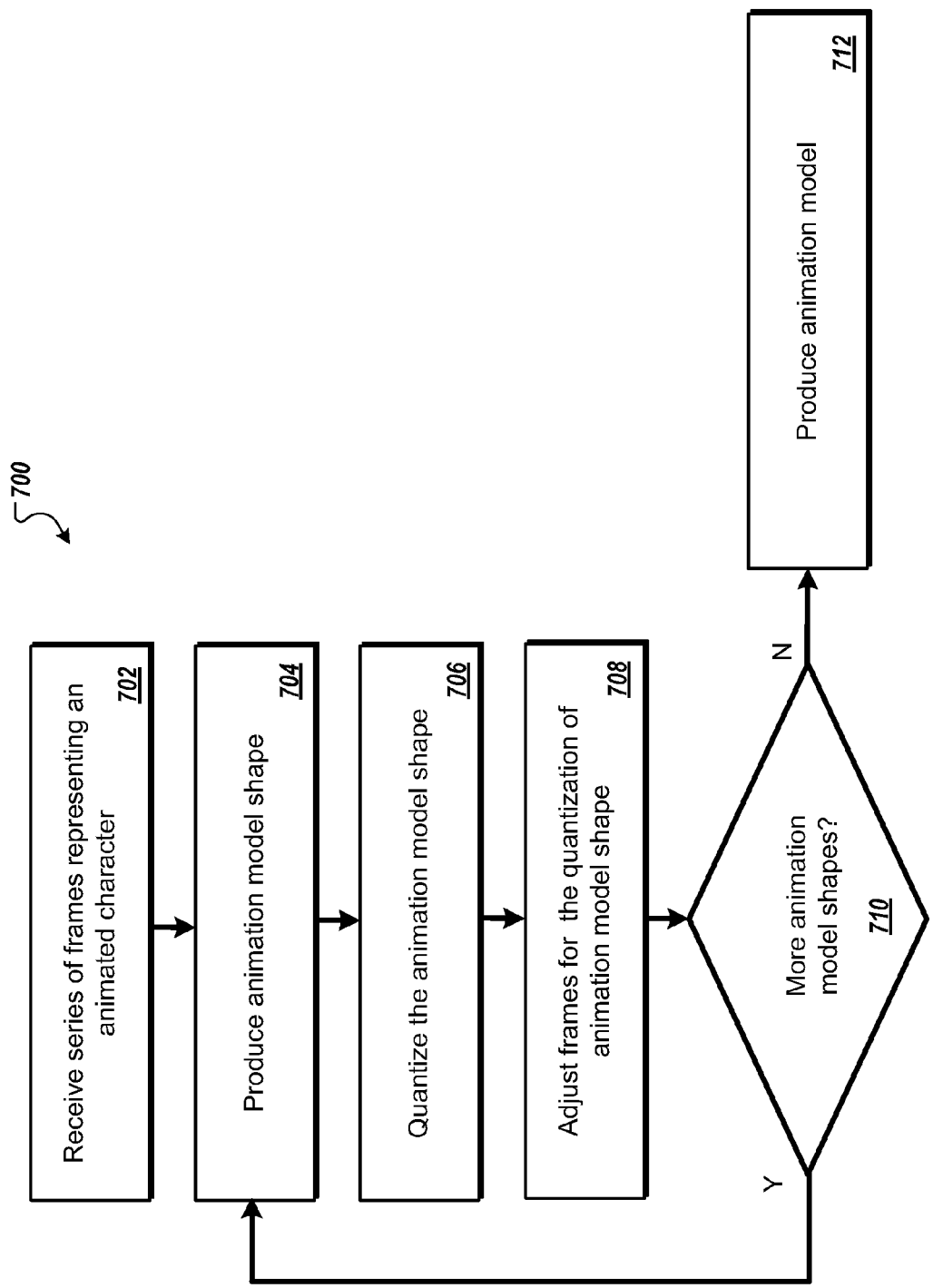
FIG. 7 is an exemplary flowchart of operations for producing a quantized animation model.

Referring to FIG. 7, a flowchart 700 represents operations of a computing device such as the computer system 406 (shown in FIG. 4) to produce an animation model for an interactive virtual environment (e.g., a video game title) by quantizing shapes (to be included in the model) and adjusting animation frames to account for the quantization, in an iterative manner. Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computing device may include receiving 702 a series of frames that include content that represent animated character or a portion of an animated character (e.g., a character's face). In some arrangements, the series of frames may have been reduced from a larger series of frames (e.g., frames may be dropped that are expressible by other frames in the series). Once received, operations may also include producing 704 an animation model shape from the series of frames. For example, content included in the series of frames may be used by a compression technique (e.g., PCA) to produce an animation model shape (e.g., a PCA vector that represents a shape) that may be used to reconstruct the frames in the series. Upon producing the shape, operations may include quantizing 706 the animation model shape.

For example, data values (e.g., PCA vector elements) representing the shape may be converted (e.g., bits may be dropped to change a floating point value into a fixed point value). Operations may also include adjusting 708 the frames of the series for the effects of quantizing model shape. For example, content represented by the quantized shape may be subtracted from the content represented by the frame series. Once adjusted, operations may be executed to determine 710 if additional shapes are to be produced for the animation model. If more shapes are needed (e.g., the model is predefined to include thirty-two shapes), operations are executed in an iterative manner and return to produce 704 an animation model shape from the now adjusted frames. If determined that all model shapes have been computed, operations may include producing 712 the animation model from the computed shapes (e.g., the shapes are combined to form the model).

Figure 8:
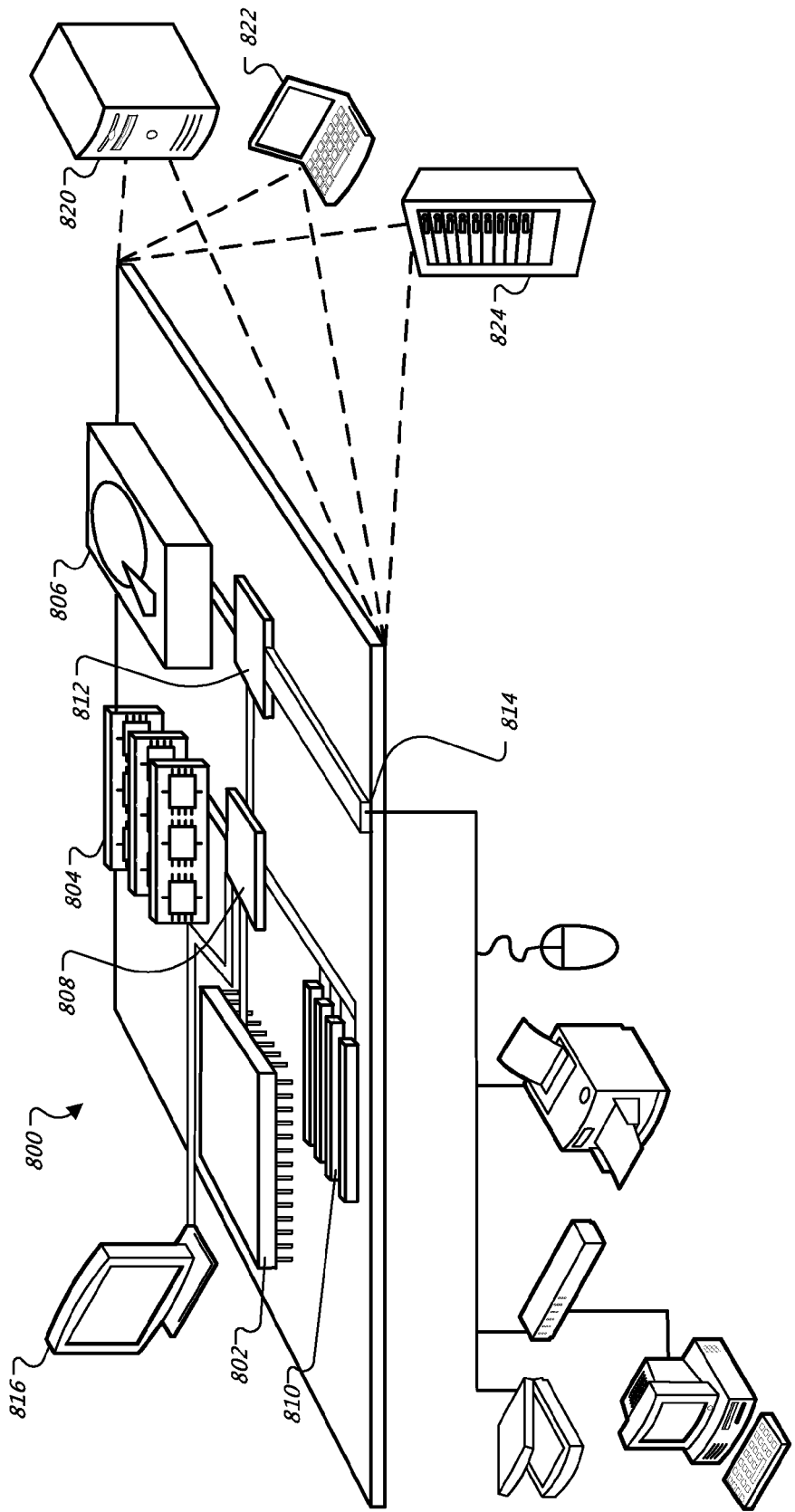
FIG. 8 is a block diagram of computing devices and systems.

FIG. 8 is a block diagram of computing devices that may be used and implemented to perform operations associated with producing animation models from a series of frames (e.g., computing a model from a reduced series of animation frames, quantizing shapes for inclusion in an animation model, etc.). As such, the computing devices may provide operations similar to computer systems, video game consoles, etc. Computing device 800 can also represent various forms of digital computers, such as laptops, desktops, workstations, personal digital assistants, servers, blade servers, mainframes, and other appropriate computers.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 700. In one implementation, the storage device 806 is a computer-readable medium. In various different implementations, the storage device 806 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or the like.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 706 and low-speed expansion port 814. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving a series of frames, the frames in the series of frames representing a portion of an animated character;
identifying one or more frames included in the series of frames, the identifying including determining if one or more adjacent frames adjacent to the identified one or more frames can be used to reconstruct the identified one or more frames using a linear combination of content expressed in the one or more adjacent frames;
removing, from the series of frames, the identified one or more frames that can be reconstructed from the one or more adjacent frames to produce a reduced series of frames for compression, the identified one or more frames being removed if the identified one or more frames can be expressed using the linear combination of the content expressed in the one or more adjacent frames; and
compressing the reduced series of frames to produce an animation model that is capable of reconstructing the series of frames for an interactive virtual environment.

2. The computer-implemented method of claim 1, in which identifying the one or more frames includes determining if a previous sequence of four adjacent frames can be used to reconstruct the identified one or more frames.

3. The computer-implemented method of claim 1, in which identifying the one or more frames includes calculating a dot product of quantities associated with two frames included in the series of frames.

4. The computer-implemented method of claim 1, in which compressing the reduced series of frames includes principal component analysis.

5. The computer-implemented method of claim 1, in which compressing the reduced series of frames includes applying a weight to one or more of the frames included in the reduced series of frames.

6. The computer-implemented method of claim 1, in which compressing the reduced series of frames includes applying a compressed weight to one or more frames included in the reduced series of frames.

7. The computer-implemented method of claim 1 in which the animation model includes thirty-two shapes.

8. The computer-implemented method of claim 1, in which the represented portion of the animated character includes a face of the character.

9. The computer-implemented method of claim 1, in which the interactive virtual environment is a video game.

10. The computer-implemented method of claim 1, in which the interactive virtual environment is a content creation environment.

11. The computer-implemented method of claim 1, in which the interactive virtual environment is a virtual reality environment.

12. A system comprising:
a computing device comprising:
a memory configured to store instructions; and
a processor configured to execute the instructions to perform a method comprising:
receiving a series of frames, the frames in the series of frames representing a portion of an animated character;
identifying one or more frames included in the series of frames, the identifying including determining if one or more adjacent frames adjacent to the identified one or more frames can be used to reconstruct the identified one or more frames using a linear combination of content expressed in the one or more adjacent frames;
removing, from the series of frames, the identified one or more frames that can be reconstructed from the one or more adjacent frames to produce a reduced series of frames for compression, the identified one or more frames being removed if the identified one or more frames can be expressed using the linear combination of the content expressed in the one or more adjacent frames; and
compressing the reduced series of frames to produce an animation model that is capable of reconstructing the series of frames for an interactive virtual environment.

13. The system of claim 12, in which identifying the one or more frames includes determining if a previous sequence of four adjacent frames can be used to reconstruct the identified one or more frames.

14. The system of claim 12, in which identifying the one or more frames includes calculating a dot product of quantities associated with two frames included in the series of frames.

15. The system of claim 12, in which compressing the reduced series of frames includes principal component analysis.

16. The system of claim 12, in which compressing the reduced series of frames includes applying a weight to one or more of the frames included in the reduced series of frames.

17. The system of claim 12, in which compressing the reduced series of frames includes applying a compressed weight to one or more frames included in the reduced series of frames.

18. The system of claim 12, in which the animation model includes thirty-two shapes.

19. The system of claim 12, in which the represented portion of the animated character includes a face of the character.

20. The system of claim 12, in which the interactive virtual environment is a video game.

21. The system of claim 12, in which the interactive virtual environment is a content creation environment.

22. The system of claim 12, in which the interactive virtual environment is a virtual reality environment.

23. A computer program product tangibly embodied in a non-transitory information carrier and comprising instructions that when executed by a processor perform a method comprising:
receiving a series of frames, the frames in the series of frames representing a portion of an animated character;
identifying one or more frames included in the series of frames, the identifying including determining if one or more adjacent frames adjacent to the identified one or more frames can be used to reconstruct the identified one or more frames using a linear combination of content expressed in the one or more adjacent frames;
removing, from the series of frames, the identified one or more frames that can be reconstructed from the one or more adjacent frames to produce a reduced series of frames for compression, the identified one or more frames being removed if the identified one or more frames can be expressed using the linear combination of the content expressed in the one or more adjacent frames; and
compressing the reduced series of frames to produce an animation model that is capable of reconstructing the series of frames for an interactive virtual environment.

24. The computer program product of claim 23, in which identifying the one or more frames includes determining if a previous sequence of four adjacent frames can be used to reconstruct the identified one or more frames.

25. The computer program product of claim 23, in which identifying the one or more frames includes calculating a dot product of quantities associated with two frames included in the series of frames.

26. The computer program product of claim 23, in which compressing the reduced series of frames includes principal component analysis.

27. The computer program product of claim 23, in which compressing the reduced series of frames includes applying a weight to one or more of the frames included in the reduced series of frames.

28. The computer program product of claim 23, in which compressing the reduced series of frames includes applying a compressed weight to one or more frames included in the reduced series of frames.

29. The computer program product of claim 23, in which the animation model includes thirty-two shapes.

30. The computer program product of claim 23, in which the represented portion of the animated character includes a face of the character.

31. The computer program product of claim 23, in which the interactive virtual environment is a video game.

32. The computer program of claim 23, in which the interactive virtual environment is a content creation environment.

33. The computer program of claim 23, in which the interactive virtual environment is a virtual reality environment.

* * * * *